United States Patent [19]

Such

[11] Patent Number: 4,595,722
[45] Date of Patent: Jun. 17, 1986

[54] THERMOPLASTIC COATING COMPOSITIONS

[75] Inventor: Christopher H. Such, Mount Eliza, Australia

[73] Assignee: Dulux Australia Ltd., Clayton, Australia

[21] Appl. No.: 645,396

[22] Filed: Aug. 29, 1984

[30] Foreign Application Priority Data

Sep. 9, 1983 [AU] Australia ............................. PG1338
Aug. 16, 1984 [AU] Australia ............................. PG6618

[51] Int. Cl.$^4$ ................................................ C08K 5/12
[52] U.S. Cl. .................................... 514/296; 524/297; 524/299; 524/298; 524/306; 524/311
[58] Field of Search ............... 524/296, 297, 298, 306, 524/311, 314

[56] References Cited

U.S. PATENT DOCUMENTS

| | | | |
|---|---|---|---|
| 3,037,955 | 6/1962 | Carman | 524/298 |
| 3,399,152 | 8/1968 | Jamrog | 524/296 |
| 3,627,779 | 12/1971 | Sandstedt | 524/296 |
| 3,673,148 | 6/1972 | Vasta | 524/311 |
| 4,168,249 | 9/1979 | Meyer | 524/296 |

FOREIGN PATENT DOCUMENTS 1143404 2/1969 United Kingdom .

Primary Examiner—Paul R. Michl
Attorney, Agent, or Firm—Cushman, Darby & Cushman

[57] ABSTRACT

This invention relates to thermoplastic coating compositions which utilize organic solvent solutions of acrylic copolymer as film-forming media.

Enhanced distortion resistance is obtained by utilizing acrylic polymer which comprises two types of polar group, the two types interacting strongly. A further embodiment utilizes in addition a plasticizer which comprises a chain of units of the formula —CO—(CH$_2$-)$_5$—O—.

The compositions are useful as lacquers for the automotive and refinish industries.

6 Claims, No Drawings

THERMOPLASTIC COATING COMPOSITIONS

This invention relates to coating compositions comprising thermoplastic acrylic polymers.

A class of coating composition well known to and widely used by the art is that wherein the film-forming medium is a solution in organic solvent of at least one acrylic polymer. Such coating compositions, frequently known as "acrylic lacquers" by the art, form films by solvent evaporation alone; no chemical reaction is involved. The first compositions of this type were based on hard polymethyl methacrylate homopolymers plasticised by the inclusion of plasticisers, but in more recent times acrylic copolymers and blends of copolymers have been used.

Thermoplastic coating compositions of this type give glossy, durable coatings and have thus been popular for many years with the automotive industry. However, they are not without their flaws. For example, the thermoplastic nature of the film-forming polymers endows the coating films with the property that they become deformable with increasing temperature. This deformability can manifest itself in a number of ways. For example, if a particle of dirt is resting on the surface of such a film and this surface is exposed to a temperature sufficient to soften it, the particle will sink partially into the film. On cooling, it will become embedded therein and be impossible to remove. Similarly, if such a coating is in a softened state in the open air, a sudden rain shower can mar the appearance. The "distortion temperature" of the coating composition, that is, that temperature at which a film of the composition becomes prone to deformations such as these should therefore be as high as possible.

In practice, this generally means that the glass transition temperature (Tg) at which the film-forming polymer changes from a "glassy" polymer to a "rubbery" polymer should be as high as possible. However, high Tg polymers are inherently brittle and this limitation has in the past been overcome by the introduction into the compositions of plasticisers. These bring their own disadvantages; many of the popular phthalate esters are volatile at normal baking temperatures, and they evaporate from the film during baking to deposit in the oven and its air circulation system, making regular cleaning a necessity. Other plasticisers such as polyesters and alkyd resins are not volatile but films containing them must be heated to much higher oven temperatures for adequate film flow to take place, this of course making the process more expensive.

I have now found that it is possible to prepare a thermoplastic acrylic coating composition which combines the advantages of a high distortion temperature and low baking temperatures without excessive plasticiser evaporation. I therefore disclose, according to the present invention, a thermoplastic coating composition wherein the film-forming medium comprises a solution in organic solvent of at least one acrylic polymer and at least one plasticiser, characterised in that there are present in the acrylic polymer complementary pairs of polar groups, as hereinunder defined.

In a further embodiment of my invention, I disclose a thermoplastic coating composition comprising complementary pairs of polar groups, as hereinabove described, and which in addition comprises at least one phthalate ester plasticiser and at least one other plasticiser having at at least one hydroxyl group and at least one grouping of the formula.

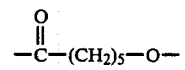

For the purposes of this invention, my use of the term "film-forming medium" covers those components of the coating compositions which actually form the continuous film and those which contribute directly to the properties of this film. Thus both the acrylic polymer and the plasticisers are part of the "film-forming medium", whereas pigments, extenders and solvents are not.

The coating compositions according to my invention comprise from 30 to 70% by weight of thermoplastic acrylic polymer. The polymer may be prepared from monomers selected from the wide range of monomers known to and used by the art for use in such polymers. Examples of suitable monomers include the $C_1$–$C_{18}$ acrylates and methacrylates and styrene and its various derivatives.

The acrylic polymer in my invention comprises complementary pairs of polar groups. By this I mean that there are present in the polymer pairs of polar groups wherein one polar group has a strong specific interaction with the other. Many such pairs are known; for example, carboxylic acid groups interact strongly with amine groups. Other pairs of groups include ester carboxyl-nitrile, aliphatic hydroxyl - aliphatic hydroxyl and sulphonic acid - ester. The technology of the interaction of polar groups is well known to the art. It has been utilised, for example, in the technology of non-aqueous dispersions, and is described in, for example, British Patent No. 1,143,404 - this document contains a comprehensive list of pairs of interacting polar groups.

The polar groups may be provided by using monomers containing suitable groups in the preparation of the acrylic polymer. Suitable monomers include acrylic and methacrylic acids, dimethylaminoethyl acrylate and methacrylate, the $C_2$–$C_4$ hydroxyalkyl acrylates and methacrylates, acrylamide and methacrylamide and acrylonitrile and methacrylonitrile. The complementary polar group need not be present initially on a monomer but may be generated in situ. For example, the carboxylic acid group of acrylic acid may be modified by reaction with an imine.

The acrylic polymer should comprise up to 30 mole percent of monomer containing at least one of the complementary polar groups. Best results are achieved when the numbers of polar groups of the two complementary types are approximately equal, but advantageous results can be obtained provided that each polar group-containing monomer is present to the extent of at least 4 mole percent.

The pairs of groups may be on the same polymer and this single polymer may be the sole film-forming polymer in the lacquer. However, I prefer that the groups of a given pair be on different polymers. It is permissible to add other acrylic polymer not containing any polar groups to the lacquer composition in order to achieve a particular balance of properties. It is also permissible to add other known film-forming materials which are known to the art, for example, cellulose acetate butyrate (CAB). The inclusion of this material permits the achievement of a particularly good balance of properties and my preferred film-forming compositions comprise from 5–50% by weight of CAB.

There are present in the coating compositions of my invention at least one plasticiser. Any of the plasticisers known to the art may be used by I prefer to use plasticisers which will permit relatively low baking temperatures. Thus, a relatively involatile phthalate ester plasticiser such as butyl benzyl phthalate gives especially good results. Other phthalate ester plasticisers such as the relatively volatile butyl cyclohexyl phthalate may be used, but such plasticisers are subject to evaporation as described hereinabove.

In one embodiment of my invention, a thermoplastic coating composition contains at least two plasticisers, at least one of which is a phthalate ester plasticiser and at least one of which is a compound comprising at least one hydroxyl group at at least one grouping of the formula:

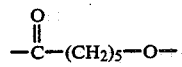

which will be referred to hereinafter as a "plasticiser unit", and the plasticiser having such units will be referred to as the "chain plasticiser".

This plasticiser unit may be derived, for example, from the compound ε-caprolactone

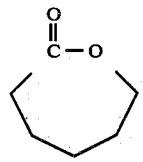

This ring will readily open in the presence of an active hydrogen atom to give a linear hydrocarbon structure with an ester group. Other plasticiser units of the above-mentioned formula can readily add on to the molecule and long chains of plasticiser units can be made. A typical example of a chain plasticiser is the reaction product of ε-caprolactone with water. In this reaction, one mole of water can react with one mole of ε-caprolactone to give a compound of the formula

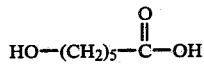

I prefer, however, that chain plasticisers have a higher molecular weight. Preferred chain plasticisers comprise chains of 10–150 plasticiser units, for example, pentaerythritol with 80 plasticiser units and ethylene glycol with 40 plasticiser units. It is, of course, permissible to blend several such plasticisers.

The use of the compound ε-caprolactone is an especially convenient way of preparing chain plasticisers for use in my invention, but it is by no means the only way of doing so, and suitable chain plasticisers prepared by alternative synthetic routes will work equally well in my invention.

The upper limit on the number of plasticiser units which can be used is imposed only by the compatibility of the chain plasticiser in the overall coating composition. The pentaerythritol/80 plasticiser unit compound is a waxy solid which is readily compatible. However, higher plasticiser unit content plasticisers are not so readily compatible and require higher oven temperatures to allow lacquers incorporating them to flow. This of course negates one of the potential advantages this invention and I find that, as a general rule, the number of plasticiser units per plasticiser molecule should not exceed 120.

The plasticisers are used in the compositions in art-recognised concentrations, that is 10–40% by weight of the film-forming medium. The plasticiser containing the above-mentioned grouping may comprise up to 70% (preferably up to 20%) by weight of the total weight of plasticiser.

The coating compositions according to my invention may comprise pigments, extenders and other recognised components in art-recognised quantities. They can be baked at low oven temperatures (about 120° C.) with negligible plasticiser loss to give glossy, durable films with high distortion temperature.

The invention is further illustrated by the following example in which all parts are expressed by weight.

EXAMPLE 1

Preparation of a thermoplastic coating composition according to the invention and comparison with a conventional material.

A silver metallic coating composition suitable for automotive use was prepared utilising a film-forming composition comprising the following components:
94/6 methyl methacrylate/butyl acrylate copolymer: 21.840 parts
98/2 methyl methacrylate/methacrylic acid copolymer: 9.750 parts
77/20/3 methyl methacrylate/butyl methacrylate/-dimethylaminoethyl methacrylate copolymer: 11.980 parts
Cellulose acetate butyrate (EAB 381-2 ex Eastman Chemicals): 28.514 parts
Cellulose acetate butyrate (EAB 381-20 ex Eastman Chemicals): 3.218 parts
Butyl benzyl phthalate: 20.235 parts
Polymeric reaction product of 1 mole pentaerythritol with 80 moles ε-caprolactone: 4.463 parts The coating composition was prepared according to the methods well known to the art and incorporated aluminium flake pigment and solvents in art-recognised quantities.

The coating composition thus prepared was thinned to spraying viscosity and applied to phosphated and primed steel panels. A commercially-available silver metallic acrylic lacquer having a film-forming medium, comprising a methyl methacrylate copolymer CAB and butyl benzyl and butyl cyclohexyl phthalate plasticisers was also sprayed on to identical panels. Both sets of panels were baked for 10 minutes at 80° C., lightly sanded and then reflow baked for 30 minutes at 135° C. to give smooth glossy films.

The coatings were tested for distortion resistance by measuring the highest temperature at which a film of egg albumen could be washed from the surface of the coating without leaving a permanent mark. The results were 41.6° C. for the commercial composition and 54.1° C. for the composition according to the invention.

EXAMPLE 2

Preparation of a thermoplastic coating composition according to the invention and comparison with a conventional material.

Example 1 was repeated with the following changes to the film-forming composition -
(a) the chain plasticiser (pentaerythritol/ ε-caprolactone reaction product) had a molecular weight of about 3000, that is, it comprised on average about 19.6 plasticiser units per molecule; and
(b) the overall plasticiser quantity remained the same but comprised equal weights to butyl benzyl phthalate and chain plasticiser.

A red metallic coating composition was thus prepared and this was tested according to the method outlined in Example 1. A conventional commercial composition with the same pigmentation was tested in a similar manner. The distortion resistance of the composition according to the invention was 51° C. and that of the commercial composition was 45° C.

EXAMPLE 3

Demonstration of the effect of varying the proportions of polar groups.

A series of coating compositions were prepared containing combinations of copolymers which comprise complementary polar groups, one of each pair of groups being on a separate polymer chain. The groups were acidic (hereinafter "A groups") derived from methacrylic acid and basic (hereinafter "B groups") derived from dimethylaminoethyl methacrylate (DMAEMA). The proportions of A+B groups were varied, keeping the total concentration of A B constant. The polymer compositions in all cases were such that the Tg's were not significantly altered.

The A group copolymer was methyl methacrylate/butyl methacrylate/methacrylic acid in the weight proportions 77/20/3. The B group copolymer was methyl methyacrylate/butyl methacrylate/DMAEMA in the weight proportions 77/20/3.

These copolymers were blended with cellulose acetate butyrate and other art-recognised ingredients to give a series of dark blue coating compositions in which the mole ratios of B groups as calculated by the formula $$\frac{\text{moles B group}}{\text{moles A group + moles B Group}}$$

were 0, 0.6 and 1.0.

The compositions were sprayed on to phosphated primed steel panels which were baked for 10 minutes at 80° C., lightly sanded and then baked for 30 minutes at 135° C. to give smooth glossy films.

The resultant films were tested for distortion resistance according to the method of Example 1 and the following results were obtained:

| Mole Ratio of B Group | Distortion Temperature (°C.) |
|---|---|
| 0 | 40 |
| 0.6 | 46 |
| 1.0 | 33 |

These results clearly show the advantage of the combination of A groups and B groups.

We claim:

1. A thermoplastic coating composition wherein the film-forming composition comprises a solution in organic solvent of at least one acrylic polymer comprised of acrylic monomer and plasticiser for the polymer, the acrylic monomer comprising at least one of two types of polar group which strongly interact with each other, the composition being characterised in that
   (a) each polar group is present to the extent that the monomer comprising that group comprises at least 4 mole percent of the total monomer; and
   (b) there are present in the composition at least two plasticisers at least one of which is a phthalate ester plasticiser and at least one of which comprises per molecule at least one hydroxyl group and at least one grouping of the formula:

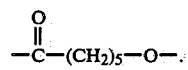

2. A thermoplastic coating composition according to claim 1, characterised in that the numbers of polar groups of the two types are approximately equal.

3. A thermoplastic coating composition according to claim 1, characterised in that the number of groupings of the formula

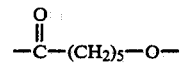

present per plasticiser molecule is from 10–120.

4. A thermoplastic coating composition according to claim 1 characterised in that the plasticiser comprising per molecule at least one hydroxyl group and at least one grouping of the formula

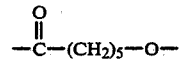

comprises up to 70% by weight of the total plasticiser present.

5. A thermoplastic coating composition according to claim 4, characterised in that the plasticiser comprising per molecule at least one hydroxyl group and at least one grouping of the formula

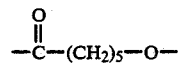

per molecule comprises 20% by weight maximum of the total plasticiser present.

6. A thermoplastic coating composition according to claim 1, characterised in that the film-forming medium comprises from 5–50% by weight of cellulose acetate butyrate.

* * * * *